United States Patent [19]

Sasaki

[11] Patent Number: 4,837,709
[45] Date of Patent: Jun. 6, 1989

[54] RECORDING APPARATUS WITH A FUNCTION OF DETERMINING RECORDING DIRECTION OF EXPLANATORY CHARACTERS FOR GRAPH

[75] Inventor: Ryoichi Sasaki, Nagoya, Japan

[73] Assignee: Brother Kogyo Kabushiki Kaisha, Nagoya, Japan

[21] Appl. No.: 850,131

[22] Filed: Apr. 10, 1986

[30] Foreign Application Priority Data

Apr. 13, 1985 [JP] Japan .................................. 60-78793

[51] Int. Cl.⁴ ............................................ G01D 9/38
[52] U.S. Cl. .................. 364/519; 346/33 R; 400/17; 400/21
[58] Field of Search ............................. 364/518–520, 364/523; 346/33 R, 139 R, 136; 400/118, 16–18, 21

[56] References Cited

U.S. PATENT DOCUMENTS

| | | | |
|---|---|---|---|
| 4,426,166 | 1/1984 | Bowling | 400/62 |
| 4,532,521 | 7/1985 | Onoda et al. | 364/520 X |
| 4,575,813 | 3/1986 | Bartlett et al. | 364/523 X |
| 4,603,396 | 7/1986 | Washizuka et al. | 364/520 |
| 4,609,918 | 9/1986 | Nakanishi et al. | 364/518 X |
| 4,627,748 | 12/1986 | Misuno et al. | 364/520 X |
| 4,642,779 | 2/1987 | Sawada | 364/520 |
| 4,644,367 | 2/1987 | Onoda et al. | 364/520 X |
| 4,695,976 | 9/1987 | Nakanishi et al. | 364/520 X |

Primary Examiner—Gary V. Harkcom
Assistant Examiner—H. R. Herndon
Attorney, Agent, or Firm—Oliff & Berridge

[57] ABSTRACT

A recording apparatus capable of recording a graphical representation such as a bar graph, broken-line graph and a pie charat, and a succession of explanatory characters accompanying the graphical representation, such that the explanatory characters are recorded selectively in a first and a second direction. The apparatus includes an input device through which the explanatory characters are entered, a recording mechanism for recording the graphical representation and the explanatory characters on a recording medium and a device for selecting the first direction if a length of the succession of explanatory characters is equal to or smaller than a reference value, and selecting the second direction if the length is larger than the reference value. The second direction is determined so as to assure a sufficient space for recording the succession of characters.

7 Claims, 6 Drawing Sheets

PEN-CONTACT/RELEASE DATA

EXPLANATORY CHARACTERS

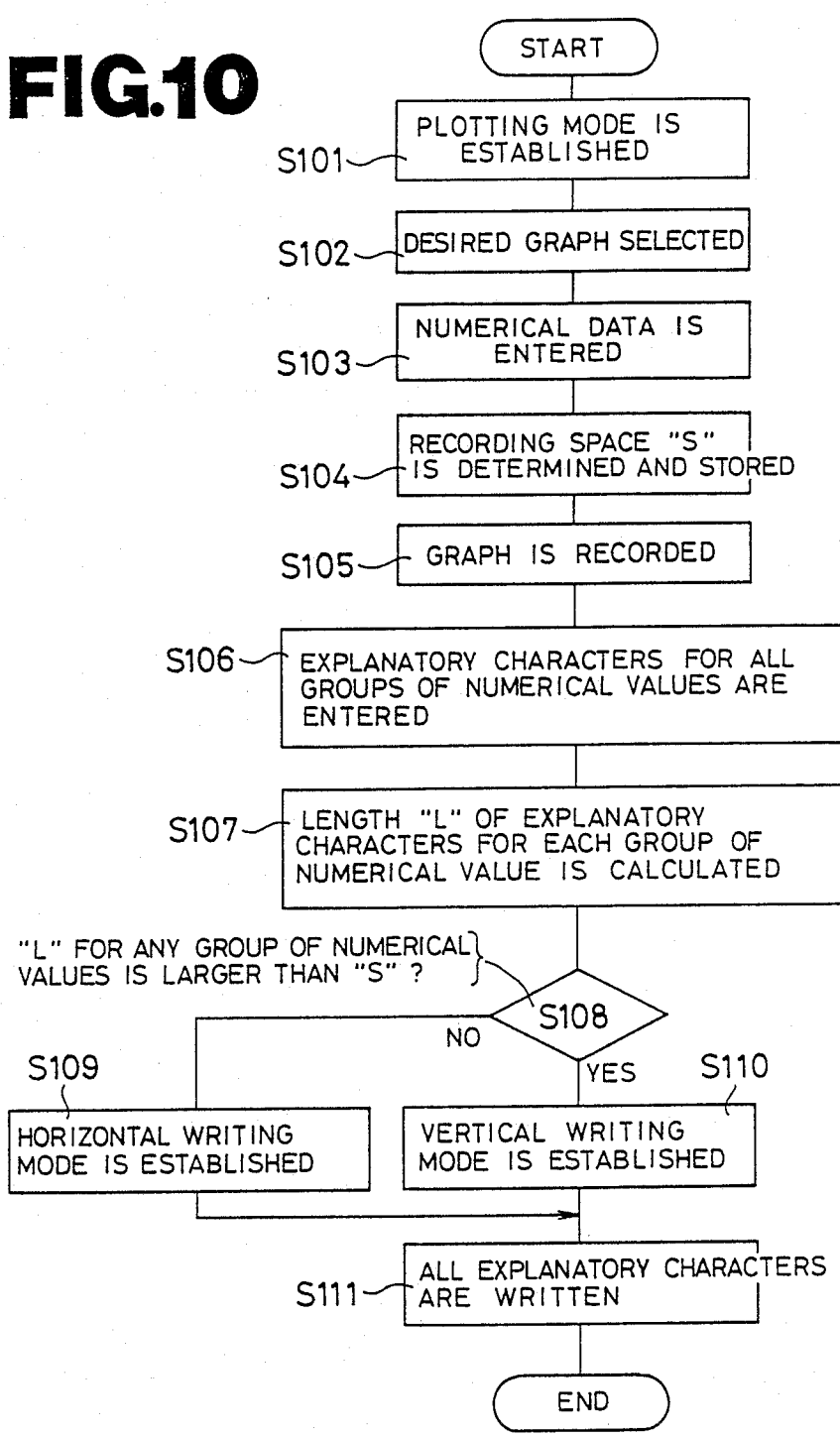

RECORDING APPARATUS WITH A FUNCTION OF DETERMINING RECORDING DIRECTION OF EXPLANATORY CHARACTERS FOR GRAPH

BACKGROUND OF THE INVENTION

1. Field of the Art

The present invention relates to a recording apparatus capable of recording a graphical representation selected from a group which include at least one of a bar graph, a broken-line graph, a circular graph (pie chart) and a radar chart, and more particularly to such a recording apparatus which is capable of recording explanatory or descriptive characters accompanying a recorded graphical representation.

2. Related Art Statement

There is known a recording apparatus of the type indicated above, wherein a desired graph is recorded together with descriptive or explanatory characters placed at suitable positions of the graph. These explanatory characters are recorded in a predetermined direction, that is, either the horizontal direction or the vertical direction.

3. Problem Solved by the Invention

Since the recording of explanatory characters is always effected in the predetermined direction, the explanatory characters in a line may be too close to each other to be clearly perceived. Consequently, the maximum number of the explanatory characters recordable is limited by the specific type and size of the graph to be prepared, and other factors. In some cases, a succession of explanatory characters may be located so close to another succession of characters that the two successions of explanatory characters may appear as a single set of explanatory information or a legend.

SUMMARY OF THE INVENTION

It is therefore an object of the present invention to provide a recording apparatus capable of recording a graphical representation, wherein explanatory characters describing the graphical representation may be recorded selectively in a suitable one of two different directions so as to avoid the inconveniences experienced with the known apparatus described above.

The object of the invention is achieved by a recording apparatus capable of recording on a recording medium a graphical representation selected from a group which include at least one of a bar graph, broken-line , graph and a circular graph, and a succession of explanatory characters accompanying the graphical representation, the succession of explanatory characters being recorded selectively in a first and a second direction, comprising: an input device through which the explanatory characters are entered; a recording mechanism for recording the graphical representation and the explanatory characters on the recording medium; and direction-determining means for selecting the first direction if a length of the succession of explanatory characters is equal to or smaller than a reference value, and selecting the second direction if the length is larger than the reference value. The selection of the second direction is determined so as to assure a sufficient recording space for the succession of characters. The reference value may be a predetermined constant.

In the recording apparatus of the invention constructed as described above, the explanatory characters are recorded in a suitable one of the first and second directions which is selected depending upon the kind and size of the graphical representation, the number of the explanatory characters to be recorded, and other factors selected as needed. Accordingly, the instant recording apparatus is free from the conventionally experienced limitation on the number of the explanatory characters that can be recorded, or jamming of the characters too close to each other to be clearly perceived.

The selection of the first and second directions is effected automatically by comparing the length of the succession of explanatory characters which is determined by the number of the characters and other factors, with the reference value. Therefore, the operator does not have to make a judgement as to the direction of recording of the explanatory characters. That is, the operator simply enters data relating to the explanatory characters. Thus, there will arise no erroneous selection of the recording direction of the explanatory characters. In the instant apparatus, the recording of the explanatory characters for the graphical representation always takes place in the suitable one of the two directions that assures a sufficient space for the succession of characters.

According to one advantageous embodiment of the invention, the direction-determining means comprises: reference-determining means for determining as the reference value a recordable length afforded in the first direction, based on graph data entered through the input device, the graph data including at least one of graphic-pattern information indicative of the kind of the graphical representation, graph-size information indicative of the size of the graphical representation, and item-number information indicative of the number of numerical values of the graphical representation, which are compared with each other; length-determining means for determining the length of the succession of explanatory characters, based on explanatory-character data entered through the input device, the explanatory-character data including at least one of character-number information indicative of the number of the explanatory characters, character-size information indicative of the size of the explanatory characters, and character-pitch information indicative of the pitch at which the explanatory characters are recorded; and comparing means for comparing the determined length of the succession of explanatory characters with the determined recordable length in the first direction, and selecting the first direction or the second direction depending upon the result of the comparison of the determined length of the explanatory characters with the determined recordable length.

According to one form of the above embodiment, the reference-determining means comprises first calculating means for calculating the recordable length based on the graph data, and first length-register means for storing the result of calculation by the first calculating means. Similarly, the length-determining means comprises second calculating means for calculating the length of the succession of explanatory characters, and second length-register means for storing the result of calculation by the second calculating means, while the comparing means comprises direction register means for storing direction data indicative of the first or second direction which is currently selected.

According to another advantageous embodiment of the invention, the recording mechanism comprises first actuator means for effecting relative movements between the recording medium and a recording instrument in a plane parallel to a surface of the recording medium, and a second actuator means for moving the recording instrument between an advanced position in which a recording end of the recording instrument contacts the surface of the recording medium, and a retracted position in which the recording end is spaced away from the surface.

The object of the present invention may also be achieved by a recording apparatus capable of recording on a recording medium a graphical representation selected from a group which include at least one of a bar graph, broken-line graph and a circular graph, and plural successions of explanatory characters accompanying the graphical representation, each of the plural successions of explanatory characters being recorded selectively in a first and a second direction, comprising: an input device through which the plural successions of explanatory characters are entered; a recording mechanism for recording the graphical representation and the plural successions of explanatory characters on the recording medium; and direction-determining means for selecting the first and second directions depending upon the lengths of the successions of explanatory characters. The direction-determining means selects the first direction for any of the successions of explanatory characters whose length is equal to or smaller than a reference value, and selects the second direction for any of the successions of explanatory characters whose length is larger than the reference value. As previously described, the second direction is determined so as to assure a sufficient recording space for the succession of characters.

The direction-determining means described above may be modified so as to select the first direction if all of the successions of explanatory characters have a length which is equal to or smaller than a reference value, and select the second direction if any one of the successions of explanatory characters has a length which is larger than the reference value.

BRIEF DESCRIPTION OF THE DRAWING

These and other objects and many attendant advantages of this invention will be readily appreciated as the same becomes better understood by reference to the following detailed description when considered in connection with the accompanying drawing, in which:

FIG. 10 is a flow chart corresponding to FIG. 9, illustrating control programs used in a modified embodiment of the invention.

DETAILED DESCRIPTION OF THE PREFERRED EMBODIMENT

Referring to the accompanying drawing, a preferred embodiment of the invention will be described in detail.

Figure 1:
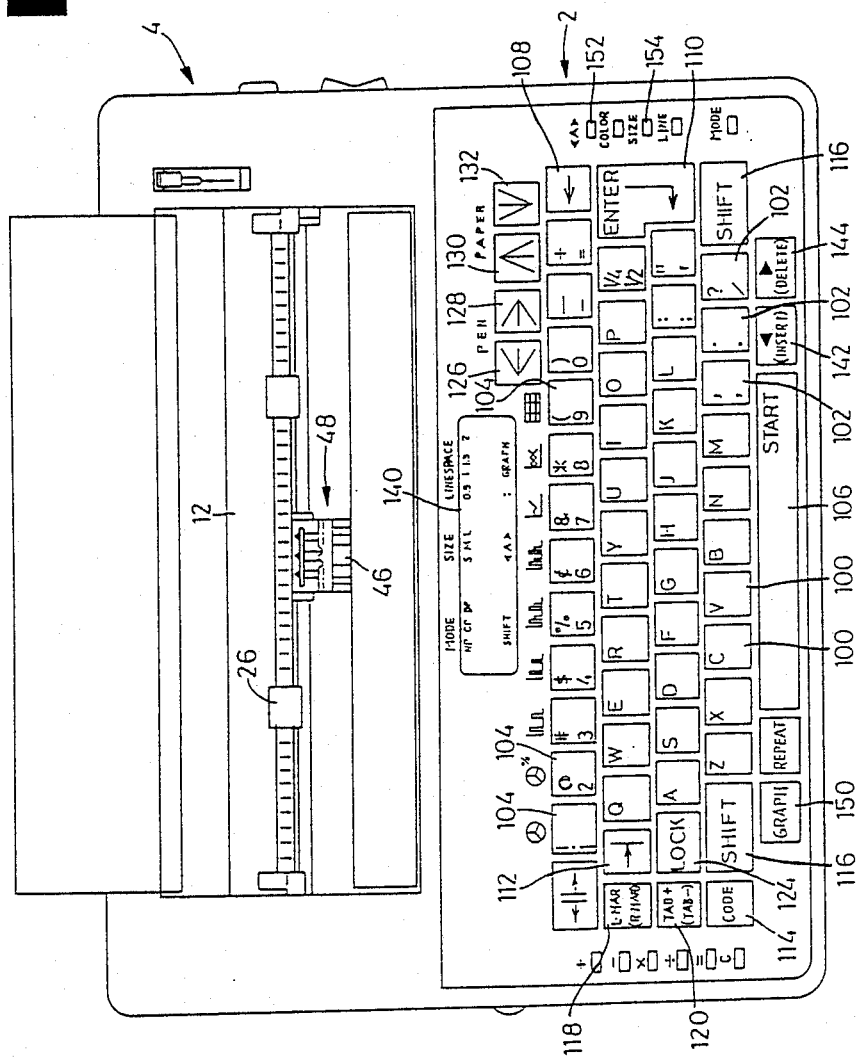
FIG. 1 is a schematic plan view of one embodiment of a recording apparatus of the invention in the form of a typewriter having a keyboard and using ball-point pens as recording instruments.

In the plan view of FIG. 1, there is shown one embodiment of a recording apparatus of the invention in the form of a typewriter which uses ball-point pens (described later) as writing instruments. The typewriter has a keyboard 2 at its front half, and a recording section 4 at its rear half.

Figure 2:
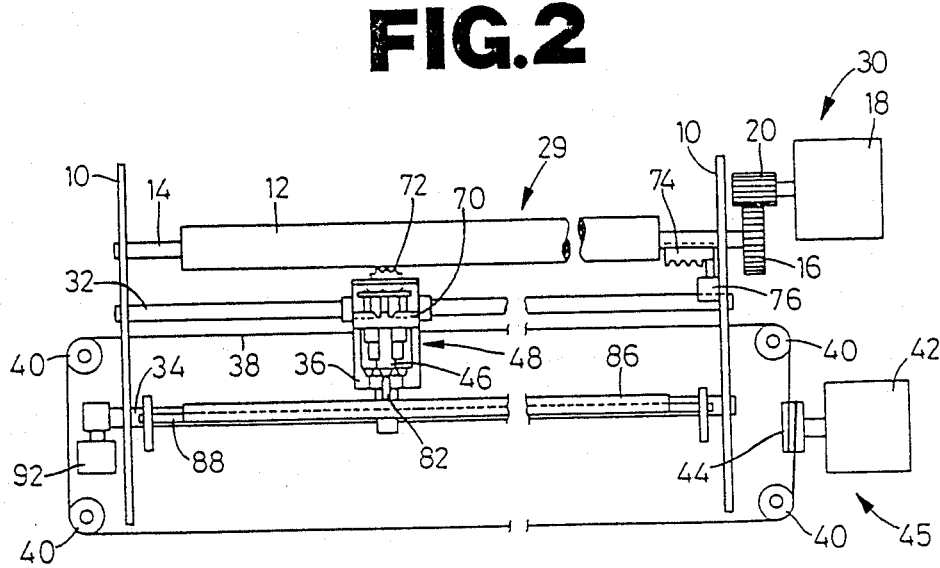
FIG. 2 is a schematic plan view of a recording mechanism of the typewriter of FIG. 1.

The recording section 4 has a recording mechanism which is schematically illustrated in FIG. 2, wherein reference numerals 10 designate a pair of opposed side frames of a main housing structure of the typewriter. These side frames 10 support rotatably a shaft 14 of an elongate cylindrical platen 12 which serves as a paper support member. The shaft 14 has a gear 16 fixed to one end thereof. The gear 16 meshes with a pinion 20 which is fixed to an output shaft 21 of a platen drive motor 18. The platen 12 is rotated by the motor 18 in a selected one of opposite directions, i.e., either a forward or reverse direction. The platen 12 cooperates with a paper pan 22, presser rollers 23, a paper guide 24, paper bail rollers 26, and other parts, which constitute a paper support device 29 which is adapted to guide and support a sheet of recording paper 28 along the circumferential surface of the platen 12. Thus, the gear 16, motor 18 and pinion 20 constitute a major part of a paper feeding device 30 for feeding the sheet of paper 28 in the Y-axis direction perpendicular to an axis of rotation of the platen 12.

Two mutually parallel guide rods 32, 34 extend parallel to the platen 12 between the opposed side frames 10. These two guide rods 32, 34 support a carriage 36 slidably along the length of the rods 32, 34. A carriage drive wire 38, which is fixed at its opposite ends to the carriage 36, is guided in a loop by four idler guide rollers 40. The drive wire 38 is wound on a driven pulley 44 fixed to an output shaft 41 of a carriage drive motor 42. With bidirectional rotary movements of the drive motor 42, the loop of the drive wire 38 is rotated in the corresponding directions, whereby the carriage 36 is reciprocated in opposite directions along the axis of the platen 12, i.e., in the X-axis direction perpendicular to the Y-axis along which the sheet of paper 23 is fed by the paper feeding device 30. The carriage 36 carries a multi-station indexable pen-holding head 48 which supports plural ball-point pens 46. In this arrangement, the ball-point pens 46 are moved in the X-axis direction when the carriage 36 is reciprocated. The guide rods 32, 34, carriage 36, drive wire 38, guide rollers 40, carriage drive motor 42, and pulley 44 constitute a major part of a carriage reciprocating device 45 for moving the ball-point pens 46 in the X-axis direction. With the X-axis movements imparted to the pens 46 by this driving device 45, in combination with the Y-axis movements of the sheet of paper 28 imparted by the paper feeding device 30, the pens 46 on the carriage 36 are movable in any directions relative to the sheet of paper 28, whereby desired characters such as letters and symbols, and desired graphs may be recorded, i.e., written or plotted on the sheet of paper 28. In the present embodiment, the paper feeding device 30 and the carriage reciprocating device 45 constitute first actuator means for effecting relative movements between the paper 28 and the pens 46 in a plane parallel to the surface of the paper 28.

Figure 3:
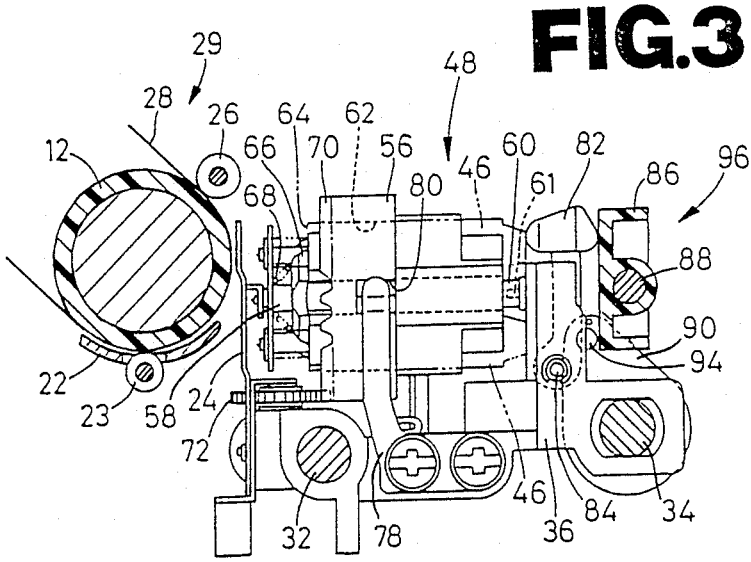
FIG. 3 is an enlarged elevational side view partly in cross section of a pen-holding head and associated apparatus.

The multi-station indexable pen-holding head 48 is constructed as shown in FIG. 3. The pen-holding head 48 includes a holder body 56 which is supported on the carriage 36 rotatably or indexably about its axis substantially perpendicular to the axis of the platen 12. Stated more particularly, the pen holder body 56 has a short shaft 58 extending from its one end on the side of the platen 12, and a boss 60 formed at its other end. The short shaft 58 is rotatably supported by the paper guide 24, while a projection 61 extending from the carriage 36 is fitted in a recess formed in the boss 60 of the holder body 56. Thus, the holder body 56 is rotatably supported on the carriage 36. The holder body 56 has four pen holes 62 which are formed in evenly spaced-apart relation with each other in the circumferential direction of the holder body 56. In other words, the pen holes 62 are equiangularly spaced from each other along a circle whose center is aligned with the axis of rotation of the holder body 56. The four pen holes 62 accommodate the respective four ball-point pens 46 of different colors so that they are axially slidable in the holes 62. Thus, the holder body 56 carries the four ball-point pens 42. The end portion of each pen 46 on the side of its writing tip is smaller in diameter than the remaining portion, and terminates at a shoulder 64 on which a biasing force of a return spring 68 is exerted via a commonly used return plate 66.

The holder body 56 is provided, at its front end on the side of the platen 12, with a gear 70 which meshes with a pinion 72 supported on the carriage 36 rotatably about a vertical axis. As shown in FIG. 2, a stationary rack 74 is disposed adjacent to the right-hand side end (as viewed in FIG. 2) of the platen 12. Each time the pinion 72 is rotated by the rack 74, the holder body 56 is indexed so that each pen 46 may be brought into its writing position, i.e., the uppermost position at which the axis of the pen 46 is substantially normal to the surface of the platen 12. The rack 74 is operated by a solenoid 76, between its operative position in which the rack 74 engages the pinion 72, and its inoperative position in which the rack 74 is located away from the pinion 72. The holder body 56 is precisely positioned at each of the four index positions, by means of resilient engagement of a positioning spring 78 with the appropriate one of four V-notches 80 formed in the circumferential surface of the holder body 56 as indicated in FIG. 3.

A hammer 82 is disposed behind the holder body 56, and supported on the carriage 36 pivotably about a pin 84. Behind the hammer 82 is disposed a hammer drive plate 86 which is pivotable about a shaft 88. The guide rod 34 has a lever 90 fixed thereto, and the lever 90 has a pin 94 fixed thereto. When the guide rod 34 is rotated clockwise (as seen in FIG. 3) upon activation of a latching solenoid 92 (FIG. 2) connected thereto, the hammer drive plate 86 is pivoted counterclockwise (as seen in FIG. 3) by the pin 94, and consequently the hammer 82 is pivoted in the same direction. As a result, the hammer 82 advances the currently selected ball-point pen 46 against the biasing force of the return spring 68 until the writing tip of the pen 46 contacts the surface of the sheet of paper 28. At this time, the return plate 66 is flexed by a predetermined angle to permit the pen 46 to advance. The hammer 82, drive plate 86, lever 90, solenoid 92, constitute second actuator means for reciprocating the selected ball-point pen 46 between its advanced position in which its writing tip contacts the paper 28, and its retracted position in which the writing tip is separated from the paper 28.

Referring back to FIG. 1, the keyboard 2 will be described. Like a keyboard used for ordinary typewriters known in the art, the keyboard 2 has a multiplicity of character keys such as alphabetic keys 100, symbol keys 102 and numeral keys 104 and further has various function keys such as a space key (bar) 106, a backspace key 108, a carriage return key 110, a tab key 112, a code key 114, a shift key 116, a margin set key 118, a tab set key 120, a lock key 124, carriage-jog keys 126, 128 (for moving the pen 46 to the left and to the right, respectively), and platen-jog keys 130, 132 (for feeding the sheet of paper 28 upward and downward, respectively).

In an upper central part of the keyboard 2, there is provided a generally elongate rectangular liquid crystal display 140 which has a 15-digit capacity. As the character keys are operated successively, the corresponding characters are displayed on the display 140. The already displayed characters and a cursor on the display 140 are sequentially shifted one position to the right each time a new character is keyed in. The characters displayed on the display 140 may be corrected or edited by using an insert key and a delete key. A key 142 serves as the insert key when it is operated simultaneously with the code key 114, while a key 144 serves as the delete key when it is operated with the code key 114.

The keyboard 2 further comprises a graph key 150 which serves as a WRITING/PLOTTING selector key for selecting a WRITING mode for writing characters, or a PLOTTING mode for plotting graphs. The graph key 150 selects the WRITING and PLOTTING modes alternately upon repeated depression thereof. The typewriter is normally placed in the WRITING mode. When the PLOTTING mode is selected, the display 140 provides a prompting indication asking the operator to designate a desired one of graphical representations such as a circular graph (pie chart), a bar graph, and a broken-line graph. The numeral keys 104 corresponding to numerals "1" through "8" are respectively assigned to select: circular graph (pie chart) without percent indication; circular graph with percent indication; bar graph; hatched bar graph; bar graph for a plurality of data groups; hatched bar graph for a plurality of data groups; broken-line graph; and broken-line graph for a plurality of data groups. The desired kind of graph is selected by operating the corresponding numeral key 104.

After the desired graph is selected, the numeral keys 104 function as the keys for entering numerical values which are represented in the selected graphical form. In this PLOTTING mode, it is possible to enter descriptive or explanatory characters which accompany a graph to be plotted. These explanatory characters are entered through the appropriate character keys such as alphabetic and symbol keys 100, 102.

At the right-hand side end of the keyboard 2, there are disposed several keys which include a vector key 152 and a size selector key 154. The vector key 152 is used to select one of three character postures: a normal upright posture; a counterclockwise turned posture which is rotated counterclockwise 90 degrees with respect to the upright posture; and a clockwise turned posture which is rotated clockwise 90 degrees with respect to the upright posture. The size selector key 154 is used to select the size of the characters and graphs to be recorded.

Figure 4:
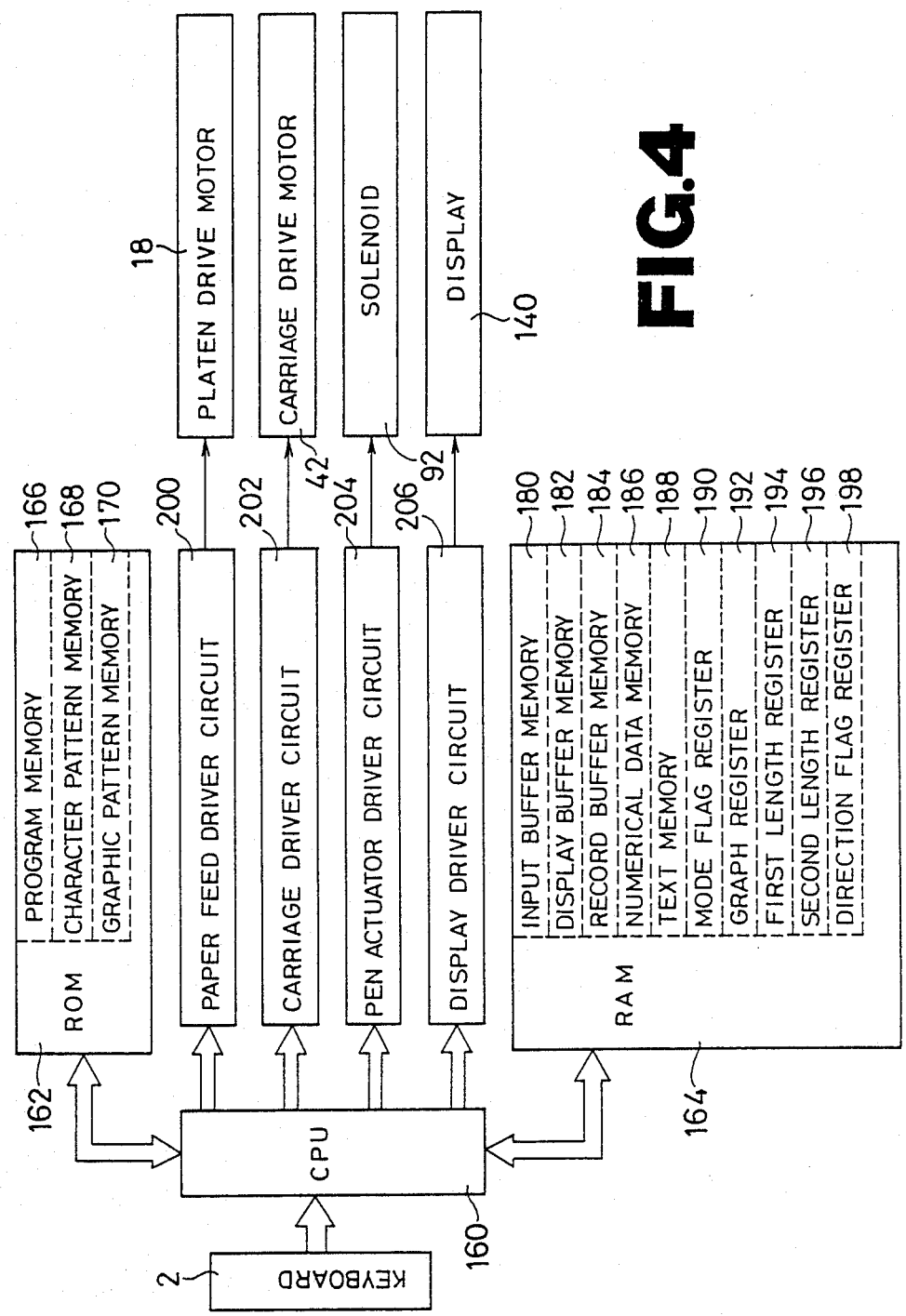
FIG. 4 is a block diagram of a control system for the typewriter of FIG. 1.
Figure 5:
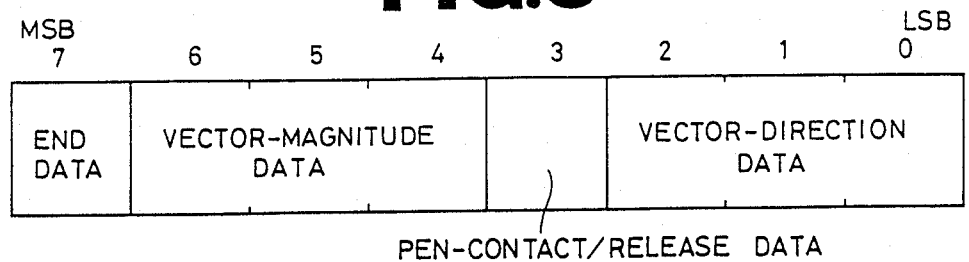
FIG. 5 is an illustration showing a byte of character pattern data stored in a character pattern memory in a read-only memory of the control system.
Figure 6:
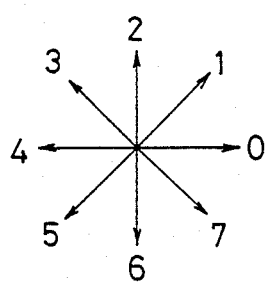
FIG. 6 is an illustration showing directions of a vector, each of which is represented by vector-direction data indicated in FIG. 5.
Figure 7:
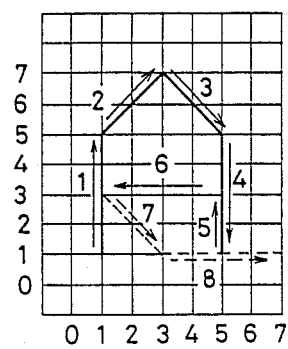
FIG. 7 is a view illustrating an example of a character written by the recording apparatus.

FIG. 4 shows a control system for controlling the recording section 4 and the display 140, according to input signals from an input device in the form of the keyboard 2. In the figure, reference numeral 160 designates a central processing unit (hereinafter referred to as CPU), to which is connected the keyboard 2. Also connected to the CPU 160 are a read only memory (hereinafter referred to as ROM) 162 and a random access memory (hereinafter called RAM) 164. The ROM 162 includes a program memory 166 storing programs shown in FIG. 9, and other programs for controlling the operation of the typewriter. The ROM 162 further includes a character pattern memory 168 which stores multiple sets of character pattern data representative of patterns of the characters which are keyed in through keyboard 2, and a graphic pattern memory 170 which stores sets of graphic pattern data representative of graphic patterns of the graphs to be recorded on the typewriter. Each set of character pattern data representing a character comprises plural bytes each of which consists of eight bits as shown in FIG. 5, and corresponds to each element or segment of the character. As illustrated in FIG. 5, the lower-order three bits (as counted from the least significant bit or LSB) are vector-direction data representative of a direction of a vector which defines the corresponding segment of the character. The next bit (fourth bit from the LSB) is pen-contact/release data which indicates contact and release conditions of the selected pen 46 with respect to the sheet of paper 28. The next three bits are vector-magnitude data representative of a magnitude of the vector which corresponds to the length of the segment. The most significant bit (MSB) is end data which indicates whether the byte involved represents the last segment of the character. Each vector representing each segment of a character may take one of eight directions as shown in FIG. 6, and has a magnitude selectable in eight steps (0 through 7) as depicted in FIG. 7. This latter figure illustrates, by way of example only, vectors defining six segments of the letter "A" (segment 5 overlapping segment 4), and two dummy segments (indicated in broken lines) which are not written (i.e., paths taken by the pen 46 in spaced-apart relation with the paper 28). In the meantime, the graphic pattern memory 170 stores sets of graphic pattern data representative of basic graphic patterns of the graphs previously described. In the present embodiment, up to twelve numerical values may be presented in the selected graph.

The RAM 164 includes: an input buffer memory 180 for temporarily storing coded data which are keyed in through the keyboard 2; a display buffer memory 182 for storing coded data for the characters to be displayed on the display 140; a record buffer memory 184 for temporarily storing coded data for the characters to be recorded by the recording section 4; a numerical data memory 186 for storing numerical data which is represented by a selected one of the graphs whose pattern data are stored in the graphic pattern memory 170; a text memory 188 for storing a relatively large batch of character data entered through the keyboard 2. The RAM 164 further includes: a mode flag register 190 for setting a mode flag indicating the currently established one of the WRITING and PLOTTING modes; a graph register 192 for setting a graph flag indicating the selected one of the graphs; a first length register 194 for storing a recordable length afforded for recording explanatory characters if recorded in a horizontal direction (first direction) with respect to the selected graph; a second length register 196 for storing a length of a succession of desired explanatory characters to be recorded for the graph; a direction flag register for setting a direction flag indicating the currently selected one of the horizontal and vertical directions in which the explanatory characters are written; and other counters and registers necessary for executing control programs to operate the typewriter.

The direction flag set by the direction flag register 198 is normally set for selecting the horizontal direction. As previously indicated, the explanatory characters are written in one of the horizontal and vertical directions (first and second directions) which are selected according to the principle of the present invention. The maximum recordable length of the explanatory characters in the horizontal direction is generally determined by the kind and size of the selected graph, and the number of numerical values which are presented in the graph. This recordable length is calculated by the CPU 160 based on the content of the graph register 192 and the content of the numerical data memory 186, i.e., based on graph data which includes: graphic-pattern information indicative of the kind of the selected graph, graph-size information indicative of the size of the graph, and item-number information indicative of the number of numerical values of the graph, which are compared to each other in the graph. The calculated recordable length is stored in the first length register 194. The CPU 160 further calculates the length of the succession of explanatory characters to be plotted, based on explanatory-character data entered through the keyboard 2. The explanatory-character data includes: character-number information indicative of the number of the explanatory characters to be written; character-size information indicative of the size of the explanatory characters; and character-pitch information indicative of the pitch at which the explanatory characters are written. The calculated length of the explanatory characters is stored in the second length register 196. Thus, the CPU 160 serves as first and second calculating means for calculating the recordable length and the length of the explanatory characters, respectively. The first calculating means and the first length register 194 cooperate to constitute reference-determining means for determining the previously indicated recordable length in the horizontal direction. As will be described, this recordable length is used as a reference value when the CPU 160 makes a judgement to select one of the horizontal and vertical directions. Further, the second calculating means and the second length register 196 cooperate to constitute length-determining means for determining the length of the succession of explanatory characters which are to be written for the selected graph.

There are also connected to the CPU 160 a paper feed driver circuit 200, a carriage driver circuit 202, a pen actuator driver circuit 204, and a display driver circuit 206. These driver circuits 200, 202, 204 and 206 are connected to the platen drive motor 18, carriage drive motor 42, solenoid 92 and liquid crystal display 140, respectively.

When character keys such as the alphabetic keys 100, symbol keys 102 and numeral keys 104 are operated in the WRITING mode, the corresponding coded signals are produced from the keyboard 2. With the appropriate function keys operated, the CPU 160 operates to retrieve from the character pattern memory 168 of the ROM 162 character pattern data corresponding to the coded signals from the keyboard 2. The CPU 160 controls the paper feed driver circuit 200, carriage driver circuit 202, and pen actuator driver circuit 204, to activate the drive motors 18, 42 and the solenoid 92 so as to record the characters represented by the retrieved character pattern data. When the typewriter is placed in the PLOTTING mode, the CPU 160 judges that the entered characters are used as explanatory characters which accompany a graph.

Figure 8:
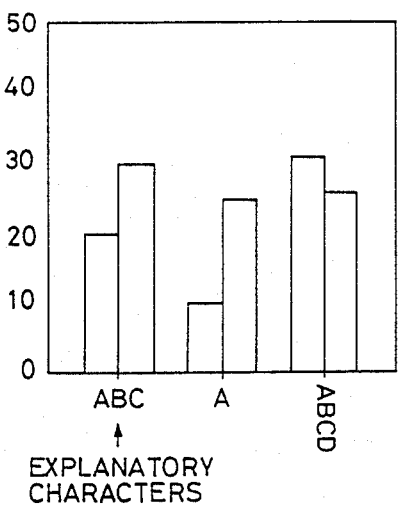
FIG. 8 is a view showing an example of a graph to be recorded on the typewriter, and two different directions in which explanatory characters are recorded.
Figure 9:
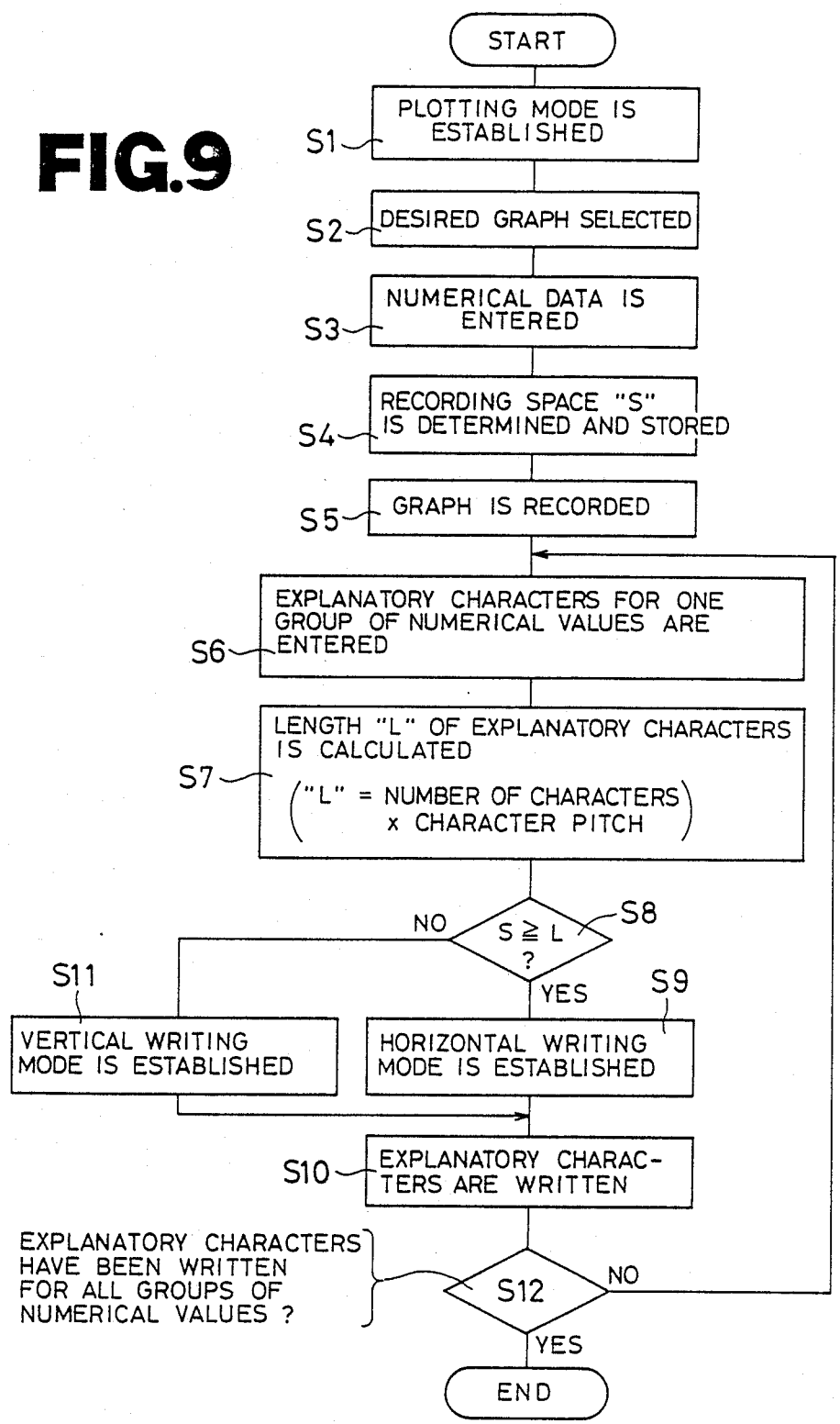
FIG. 9 is a flow chart illustrating control programs in accordance with the present invention.

Referring to FIGS. 8 and 9, there will be described a manner in which a succession of explanatory characters are written below a bar graph which represents three groups of numerical data, each group consisting of two numerical values which are compared with each other. In this connection, it is noted that the flow chart of FIG. 9 shows only those steps which are essential to the understanding of the concept of the present invention.

With the graph key 150 operated, the CPU 160 executes step S1 to switch the mode flag of the mode flag register 190 from the WRITING mode to the PLOTTING mode. When the PLOTTING mode is thus established, the liquid crystal display 140 provides a prompting indication asking the operator to select a desired one of the graphs which are designated by the numeral keys 104 corresponding to numerals "1" through "8". If the numeral key 104 corresponding to numeral "5" is operated, the CPU 160 goes to step S2 to designate the graphic pattern data in the graphic pattern memory 170, which corresponds to the bar graph for representing a plurality of numerical data groups.

Successively, the CPU 160 goes to step S3 in which the CPU 160 is ready to receive entry of numerical data. Each numerical value of each data group is entered by using the appropriate numeral keys 104, and the symbol key 102 corresponding to the decimal point, if necessary. The entered numerical value is stored in the numerical data memory 186 by operating the carriage return key 110 (which functions as an enter key when operated in the PLOTTING mode, and is hereinafter referred to as "enter key"). Thus, all of the three numerical data groups of the bar graph of FIG. 8 may be stored in the numerical data memory 186. In the present example of the bar graph of FIG. 8, successions of explanatory characters such as "ABC" are provided below the horizontal axis (abscissa) of the graph. The previously described recordable length for recording each succession of such explanatory characters if recorded in the horizontal direction (along the abscissa), is determined by the size of the bar graph n question, and by the number of numerical values of each data group (each group consisting of two numerical values in this example). In other words, the recordable length is determined by a distance "S" between adjacent groups of the two bars (two numerical values). This distance "S" is used as a reference value for judging whether each succession of explanatory characters may be recorded in the horizontal direction or not. For this purpose, the CPU 160 executes step S4 in which the distance "S" or reference value "S" (recordable length) is calculated by the CPU 160, based on the selected kind and size of the graph, and the number of the numerical values of each numerical data group of the graph. The calculated reference value "S" is stored in the first length register 194, in the same step S4. If the space key 106 (functioning as a start key in the PLOTTING mode) is operated after the entry of all numerical values for the bar graph, the CPU 160 goes to step S5 to start a plotting operation for drawing the bar graph which represents the entered groups of numerical data, as indicated in FIG. 8. More specifically, the CPU 160 controls the driver circuits 200, 202 and 204 according to the graphic pattern data retrieved from the graphic pattern memory 170, and the numerical data retrieved from the numerical data memory 186. Since this aspect of the plotting operation is not essential to the understanding of the principle of the present invention, no further description will be provided.

After the completion of the plotting operation, the CPU 160 goes to step S6 in which the CPU 160 is ready to receive an entry of a succession of explanatory characters to be written for the first group of numerical data. These explanatory characters are entered and stored in the record buffer memory 184 by using the character keys 100, 102 and the enter key. In this connection, a length "L" of the entered succession of explanatory characters is determined by the number and size of the explanatory characters. This length "L" is calculated in step S7, based on the previously indicated explanatory-character information, and the calculated length "L" is stored in the second length register 196.

Step S7 is followed by step S8 in which the CPU 160 compares the length "L" in the second length register 196 with the reference value "S" in the first length register 194. If the judgement in step S8 reveals that the reference value "S" is equal to or larger than the length "L", the CPU 160 goes to step S9 in which the horizontal writing mode is established, and to step S10 to write the entered succession of explanatory characters below the first group of the bars, in the horizontal direction or along the abscissa, as indicated in FIG. 8. In other words, the recordable length "S" in the horizontal direction is sufficient to accommodate the length "L" of the succession of explanatory characters for the first group of the bars of the bar graph. If the judgement in step S8 indicates that the reference value "S" is smaller than the length "L", step S8 is followed by step S11 to change the direction flag of the direction flag register 198 to the vertical writing mode. In this case, the succession of explanatory characters are written in step S10 in the vertical direction so as to extend from the abscissa of the graph, as indicated at the third group of the bars in FIG. 8. More specifically, the vector-direction data of the character pattern data retrieved from the character pattern memory 168 is modified so that the characters are turned 90 degrees in the clockwise direction (as seen in FIG. 8). Step S10 is followed by step S12 to check if explanatory characters have been written for all of the three groups of bars (numerical values), or not. If not, steps S6 through S12 are repeated. Thus, the appropriate explanatory characters are written for all of the three groups of bars.

As previously indicated, the CPU 160 and the first length register 194 constitute the reference-determining means for determining the reference value "S" (recordable length), while the CPU 160 and the second length register 196 constitute the length-determining means for determining the length "L" of each succession of explanatory characters which have been entered through the keyboard 2. As is apparent from the foregoing description, the present embodiment is adapted to write or record each succession of explanatory characters in a suitable one of the horizontal and vertical directions, by selecting the vertical writing mode if the recordable length "S" is smaller than the actual length "L" of the succession of explanatory characters. Hence, a plurality of successions of explanatory characters may be placed with suitable amounts of spaces left between the adjacent successions of explanatory characters. Further, the CPU 160 automatically selects the suitable writing direction based on the graph data (such as the number of numerical values of each data group) and the explanatory-character data (such as the number of the explanatory characters). Therefore, the operator is freed from cumbersome calculation of the recordable length and the actual length of the explanatory characters, and from selecting of the direction in which the explanatory characters are written. Thus, the instant arrangement prevents otherwise possible erroneous selection of the writing direction by the operator.

Referring next to FIG. 10, a modified embodiment of the invention will be described.

In this modified embodiment, steps S101 through S105 are identical with steps S1 through S5 in the preceding embodiment, but step S106 and the subsequent steps are different from the corresponding steps of the preceding embodiment. Described in more detail, necessary explanatory characters are entered for all groups of bars of the bar graph in step S106. Further, the lengths "L" of all successions of explanatory characters for the corresponding groups of bars are calculated and stored in the second length register 196 in the following step S107. Then, the CPU 160 goes to step S108 to check if the length "L" of any one of the successions of explanatory characters is larger than the reference value "S". If the judgement in step S108 is negative (NO), namely, if the recordable length "S" in the horizontal direction below each group of bars of the bar graph is sufficient to accommodate the length "L" of every one of all successions of explanatory characters, the CPU 160 then goes to execute step S109 to establish the horizontal writing mode. In this case, the writing of every succession of explanatory characters is effected in step S111 in the horizontal direction. However, if the judgement in step S108 finds any succession of explanatory characters whose length "L" is larger than the reference length or recordable length "S", then the CPU 160 executes step S110 to establish the vertical writing mode. In this case, all successions of explanatory characters are written in the vertical direction. That is, the explanatory characters written for a given group of numerical values may be in the vertical direction even if the length "L" necessary for recording the characters is smaller than the recordable length "S".

As described above, the present modified embodiment is adapted to record all successions of explanatory characters in the same direction, either horizontal or vertical, whereby the explanatory characters give an orderly impression.

While the illustrated embodiments are adapted to enter the explanatory characters after the selected graph has been plotted, it is possible to modify the control program so that the plotting of a group of bars and the writing of a succession of explanatory characters may be accomplished concurrently. Although the explanatory characters are disposed below the horizontal axis or abscissa in the illustrated embodiments, the principle of the present invention is also applicable to the insertion of such explanatory characters or legends to identify symbols or abbreviations, in suitable blanks within a graph. Further, the concept of the invention is applicable to various types of graphical representations such as broken-line graphs and pie charts, other than the bar graph illustrated in FIG. 8.

It will be understood that the present invention may be practiced with various other changes, modifications and improvements which may occur to those skilled in the art, without departing from the spirit and scope of the invention defined in the appended claims.

What is claimed is:

1. A recording apparatus capable of recording on a recording medium a graphical representation selected from a group which includes at least one of a bar graph, a broken-line graph and a circular graph, and a succession of explanatory characters accompanying the graphical representation, said succession of explanatory characters being recorded selectively in a first and a second direction, said recording apparatus comprising:

an input device through which explanatory-character data indicative of said explanatory characters and graph data indicative of said graphical representation are entered;

memory means connected to said input device for storing said explanatory-character data and said graph data;

a recording mechanism connected to said memory means for recording said graphical representation and said explanatory characters on said recording medium; and direction-determining means connected to said memory means for selecting said first direction if a length of said succession of explanatory characters is equal to or smaller than a reference limit value, and selecting said second direction if said length is larger than said reference limit value, the selection of said second direction assuring a sufficient recording space for said succession of characters.

2. A recording apparatus according to claim 1, wherein said direction-determining means comprises:

reference-determining means for determining as said reference limit value a recordable length afforded in said first direction, based on said graph data stored in said memory means, said graph data including at least one of graphic-pattern information indicative of the kind of said graphical representation, graph-size information indicative of the size of said graphical representation, and item-number information indicative of the number of numerical values of said graphical representation;

length-determining means for determining said length of said succession of explanatory characters, based on said explanatory-character data, said explanatory-character data including at least one of character-number information indicative of the number of said explanatory characters, character-size information indicative of the size of said explanatory characters, and character-pitch information indicative of the pitch at which said explanatory characters are recorded; and comparing means responsive to said reference-determining means and length-determining means for comparing the determined length of said succession of explanatory characters with the determined recordable length in said first direction, and selecting said first direction or said second direction depending upon the result of said comparison of said determined length of said explanatory characters with said determined recordable length.

3. A recording apparatus according to claim 2, wherein said reference-determining means comprises first calculating means for calculating said recordable length based on said graph data, and first length-register means for storing the result of said calculation by said first calculating means, said length-determining means comprising second calculating means for calculating said length of said succession of explanatory characters, and second length-register means for storing the result of said calculation by said second calculating means; and said comparing means comprising direction register means for storing direction data indicative of said first or second direction which is currently selected.

4. A recording apparatus according to claim 1, wherein said reference limit value is a predetermined constant.

5. A recording apparatus according to claim 1, wherein said recording mechanism comprises:

first actuator means for effecting relative movements between said recording medium and a recording instrument in a plane parallel to a surface of said recording medium; and second actuator means for moving said recording instrument between an advanced position in which a recording end of said recording instrument contacts said surface of the recording medium, and a retracted position n which said recording end is spaced away from said surface.

6. A recording apparatus capable of recording on a recording medium a graphical representation selected from a group which includes at least one of a bar graph, a broken-line graph and a circular graph, and plural successions of explanatory characters accompanying the graphical representation, each of said plural successions of explanatory characters being recorded selectively in a first and a second direction, said recording apparatus comprising:

an input device through which explanatory-character data indicative of said plural successions of explanatory characters and graph data indicative of said graphical representation are entered;

memory means connected to said input device for storing said explanatory-character data and said graph data;

a recording mechanism connected to said memory means for recording said graphical representation and said plural successions of explanatory characters on said recording medium; and direction-determining means connected to said memory means for selecting said first and second directions depending upon the lengths of said successions of explanatory characters, said direction-determining means selecting said first direction for any of said successions of explanatory characters whose length is equal to or smaller than a reference limit value, and selecting said second direction for any of said successions of explanatory characters whose length is larger than said reference limit value, the selection of said second direction assuring a sufficient recording space for said any one of said successions of characters whose length is larger than said reference value.

7. A recording apparatus capable of recording on a recording medium a graphical representation selected from a group which includes at least one of a bar graph, a broken-line graph and a circular graph, and plural successions of explanatory characters accompanying the graphical representation, each of said plural successions of explanatory characters being recorded selectively in a first and a second direction, said recording apparatus comprising:

an input device through which explanatory-character data indicative of said plural successions of explanatory characters and graph data indicative of said graphical representation are entered;

memory means connected to said input device for storing said explanatory-character data and said graph data;

a recording mechanism connected to said memory means for recording said graphical representation and said plural successions of explanatory characters on said recording medium; and direction-determining means connected to said memory means for selecting said first direction if all of said successions of explanatory characters have a length which is equal to or similar than a reference limit value, and selecting said second direction if any one of said successions of explanatory characters has a length which is larger than said reference limit value, the selection of said second direction assuring a sufficient recording space for said any one of said successions of characters.

* * * * *